United States Patent [19]

Ruter

[11] Patent Number: 5,457,347
[45] Date of Patent: Oct. 10, 1995

[54] HEADLIGHTS "ON" CONTROL FOR MOTOR VEHICLES

[76] Inventor: Lewis L. Ruter, 1220 Main St. No. 6, Minneapolis, Minn. 55413

[21] Appl. No.: 208,949

[22] Filed: Mar. 10, 1994

Related U.S. Application Data

[63] Continuation-in-part of Ser. No. 911,905, Jul. 10, 1992, abandoned, which is a continuation-in-part of Ser. No. 763,282, Sep. 20, 1991, Pat. No. 5,130,905, which is a continuation-in-part of Ser. No. 615,355, Nov. 6, 1990, Pat. No. 5,051,873.

[51] Int. Cl.[6] ................................................. B60Q 1/00
[52] U.S. Cl. ......................... 307/10.1; 362/62; 362/253; 307/10.8; 315/82
[58] Field of Search ..................... 315/81–84; 307/10.1, 307/10.8; 362/62, 253, 80, 276

[56] References Cited

U.S. PATENT DOCUMENTS

| | | | |
|---|---|---|---|
| 3,500,119 | 3/1970 | Price | 315/82 |
| 3,500,120 | 3/1970 | Schultz | 315/82 |
| 3,519,837 | 7/1970 | Nolin et al. | 315/42 |
| 3,591,845 | 7/1971 | Vanderpoel | 315/82 |
| 3,600,596 | 8/1971 | Aloisantoni | 315/82 |
| 3,702,415 | 11/1972 | Schultz | 315/83 |
| 3,767,966 | 10/1973 | Bell | 315/83 |
| 3,824,405 | 7/1974 | Glaze | 315/82 |
| 3,909,619 | 9/1975 | Kniesly et al. | 307/10.1 |
| 4,009,363 | 2/1977 | Binegar | 315/82 |
| 4,010,380 | 3/1977 | Bailer et al. | 315/82 |
| 4,057,742 | 11/1977 | Binegar | 315/82 |
| 4,236,099 | 11/1980 | Rosenblum | 315/83 |
| 4,330,716 | 5/1982 | Rust | 307/10.8 |
| 4,337,400 | 6/1982 | Hahn | 315/82 |
| 4,656,363 | 4/1987 | Carter et al. | 315/82 |
| 4,928,036 | 5/1990 | Abboud | 315/82 |
| 4,956,562 | 9/1990 | Benedict et al. | 307/10.8 |
| 4,983,883 | 1/1991 | Roland | 315/77 |
| 4,985,660 | 1/1991 | Cronk | 315/80 |
| 5,027,001 | 6/1991 | Torbert | 307/10.1 |
| 5,136,209 | 8/1992 | Benedict et al. | 315/80 |

FOREIGN PATENT DOCUMENTS 2064238   6/1981   United Kingdom.

Primary Examiner—Peter S. Wong
Assistant Examiner—Aditya Krishnan
Attorney, Agent, or Firm—Burd, Bartz & Gutenkauf

[57] ABSTRACT

An electrical control system for turning ON the headlights and taillights of a motor vehicle that has a first relay operable to turn the headlights and taillights ON when the ignition switch it turned ON. The first relay has a solenoid connected to the ignition switch and a pair of switches connected to the battery, headlights and taillights. A wiper control switch is connected to a second relay which turns the headlights and taillights ON when the windshield wipers are operating in the event of failure of the first relay or electrical circuit thereto.

20 Claims, 2 Drawing Sheets

HEADLIGHTS "ON" CONTROL FOR MOTOR VEHICLES

CROSS REFERENCE TO RELATED APPLICATIONS

This application is a continuation-in-part of U.S. application Ser. No. 911,905, filed Jul. 10, 1992 now abandoned. Application Ser. No. 911,905 is a continuation-in-part of U.S. application Ser. No. 763,282, filed Sept. 20, 1991, U.S. Pat. No. 5,130,905. U.S. application Ser. No. 763,282 is a continuation-in-part of U.S. application Ser. No. 615,355, filed Nov. 6, 1990, U.S. Patent No. 5,051,873.

FIELD OF THE INVENTION

The invention is in the field of motor vehicle electrical systems that control the operation of the headlights, windshield wipers, starter and ignition of a vehicle, such as an automobile, truck, tractor, snowmobile and like motor vehicles.

BACKGROUND OF THE INVENTION

Motor vehicles have been, for many years, equipped with headlights, taillights and windshield wipers to facilitate the observation of the roadway by the operator of the vehicle. Electrical and vacuum control systems have been used to operate the windshield wipers independent of the headlights and taillights. It is a common safety practice to have the headlights and taillights turned ON during inclement weather conditions such as rain, fog, hail, snow, sleet, mist and the like. It is also an advised practice to turn the headlights and taillights ON whenever the vehicle is operated. The switches and controls for operating the headlights are separate and independent from the controls for the windshield wipers. This allows the operator of the vehicle to use the windshield wipers with the headlights OFF. A conscious effort must be made by the vehicle operator to turn the headlights ON in daylight conditions each time the vehicle is operated and during inclement weather. A number of vehicles are operated with the windshield wipers ON and the headlights OFF. Some vehicle operators inadvertently leave the headlights ON after the vehicle has been parked. This will discharge the battery over an extended period of time and eventually result in a dead battery. The laws of some states require that headlights of the vehicle be turned ON when the windshield wipers are operated. The operator of the vehicle must separately operate the windshield wiper controls and the headlight controls to achieve operation of the windshield wipers with the headlights ON.

SUMMARY OF THE INVENTION

The invention is an electrical control system that turned the headlights and taillights of a motor vehicle ON when the vehicle's motor is operating. The headlights and taillights are also ON during operation of the vehicle's windshield wipers. The control system has a first relay operatively connected to the ignition switch of the vehicle which functions to turn the headlights and taillights ON when the ignition switch is turned ON. The first relay includes a malfunction indicator which signals the operator of the vehicle that the headlights and taillights are OFF. A manually-operated switch bypasses the relay to allow the operator to turn ON the headlights and taillights in the event that the relay is not operating. A wiper control switch used to turn ON the windshield wipers is connected to a second relay that operates to turn ON the headlights and taillights when the wiper control switch is turned ON in the event that the headlights and taillights are OFF due to a short or malfunction of the first relay. A second relay is a back-up switch to make sure that the headlights and taillights are ON when the windshield wipers are operating. The headlights and taillights are always ON when the windshield wipers are operating. In one embodiment of the control system, a normally open light responsive switch connected to the second relay, is operable to automatically turn ON the headlights and taillights, and operate the windshield wipers when light intensity falls below a selected value. In one embodiment of the electrical control apparatus of the invention for connecting an electrical power source, such as a battery, to vehicle headlights, taillights and electric-powered motor for operating the windshield wipers of a motor vehicle, the ignition switch is used to activate a solenoid-operated switch that, when ON, connects the battery to the headlights and taillights. The ignition switch is turned to the START position, electric power to all other vehicle electric circuits, except the ignition and emergency light circuits are OFF to conserve electric power for the starter motor. When the ignition switch is in the RUN position, the solenoid is energized. The solenoid-operated switch has a normally closed switch and a pair of normally open switches. The closed switch is connected to the ignition switch and an indicator light. When the light is ON, the open switches are not closed and the headlights and taillights are OFF. The pair of open switches are connected to the battery and the headlights, taillights and parking lights. When the solenoid is energized, the closed switch is open thereby turning the light OFF and the pair of open switches are closed, thereby turning the headlights, taillights and parking lights ON. The windshield wiper switch has an actuator movable to ON and OFF positions to control the operation of the windshield wipers. The windshield wiper switch is also connected to a relay operable to run the headlights and taillights ON when the windshield wiper switch is ON. The relay bypasses the solenoid-operated switch and a manually-operated switch operable to turn the headlights and taillights ON. The manually-operated switch also bypasses the solenoid switch. The headlights and taillights are ON during operation of the windshield wipers. Another embodiment of the electrical control apparatus has a light responsive switch coupled to a line leading to the relay and operates to automatically energize the relay and turn ON the headlights and taillights, and operate the windshield wipers in dark environment.

DESCRIPTION OF THE PREFERRED EMBODIMENT

Figure 1:
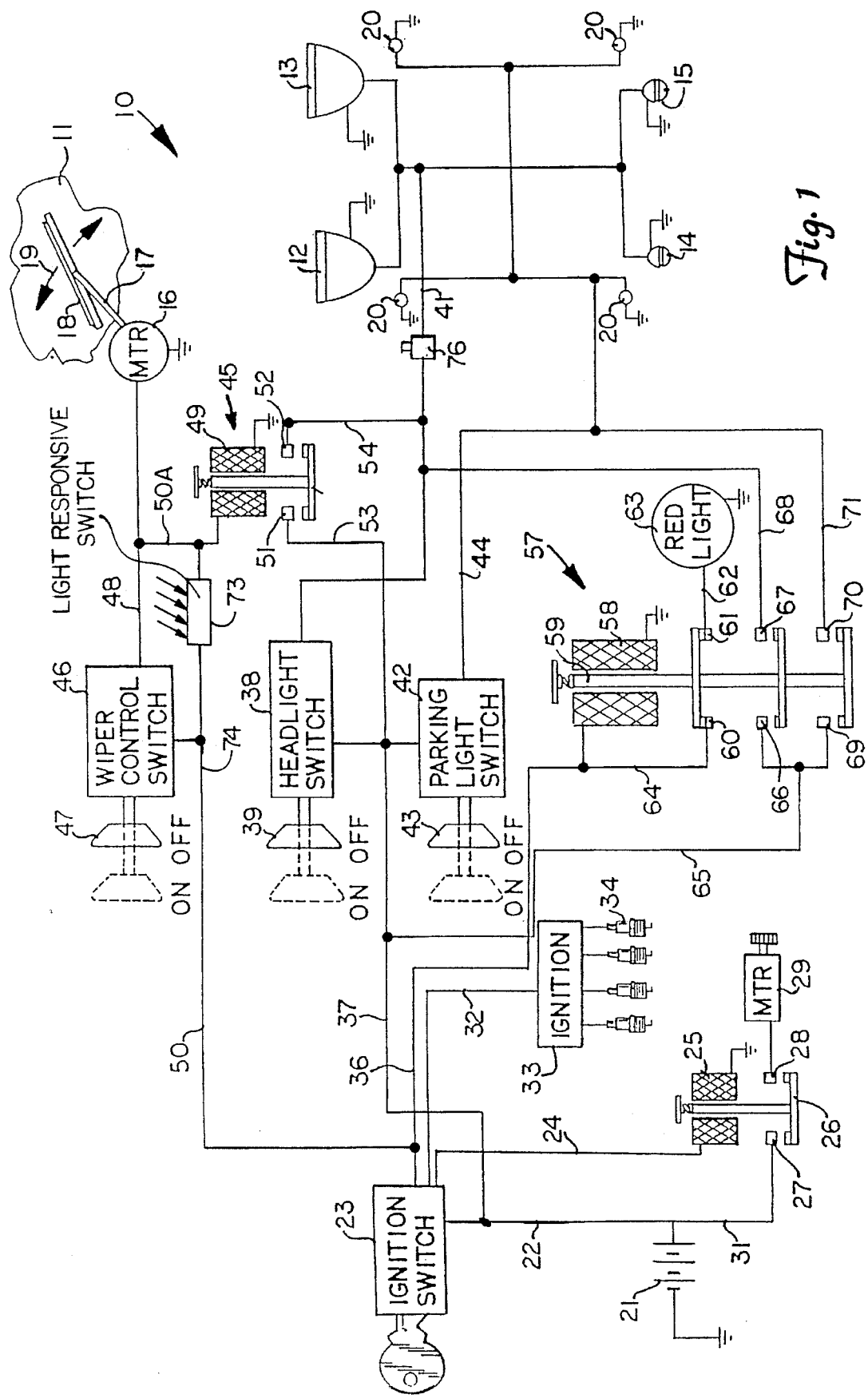
FIG. 1 is a diagrammatic view of a first motor vehicle electric system for controlling the headlights, taillights, parking lights and windshield wipers of the invention.

Referring to FIG. 1, there is shown an electric system, indicated generally at 10, for a motor vehicle such as an automobile, a pick-up truck, tractor, snowmobile and like motor vehicles equipped with headlights, taillights, parking lights and windshield wipers. The vehicle has a conventional windshield 11, a pair of front headlights 12, 13 and a pair of rear taillights 14, 15. The windshield wiper has a wiper motor 16, such as a DC electric motor, joined to a gear head connected to an arm 17. A blade 18, pivotally mounted on the outer end of arm 17, is moved over windshield 11 in the direction of arrows 19 on operation wiper motor 16. The vehicle is also equipped with the conventional parking lights 20, located at the front and rear portions of the vehicle.

The electric power for the vehicle is supplied from a conventional battery 21 joined with a cable 22 to an ignition switch 23 that is normally mounted on the dash or steering column of the vehicle in the drivers compartment. Ignition switch 23 is a key-operated switch having START, RUN and OFF positions. The switch can have a power ON position between the RUN and OFF positions. When switch 23 is turned to the START position, all electric power to electric circuits other than the ignition circuit and emergency light circuits is OFF to provide maximum electric power to starter motor 29. An electric conductor line 24 connects switch 23 to solenoid 25 of a starter relay. The starter relay has a movable plunger 26 that is adapted to engage switch contacts 27 and 28, and connect starter motor 29 to battery 21. A cable 31 connects battery 21 to contact switch 27. When solenoid 25 is energized, contacts 27 and 28 are closed thereby energizing motor 29. As soon as switch 23 moves from the START position, solenoid 25 is de-energized, causing electric contact 27 and 28 to open thereby terminating the electric power to motor 29. The ignition switch 23 is also connected with a line 32 to the ignition components 33, such as an electronic ignition system coupled to vehicle spark plugs 34. Ignition switch 23 is further connected to a line 36 leading to a first relay, indicated generally at 57, to connect battery 21 to headlights 12, 13, taillights 14, 15 and parking lights 20, thereby turning these lights ON when the engine is operating. Electric power is supplied to relay 57 when ignition switch 23 is in the RUN position.

Relay 57 has three poles, with one normally ON and two normally OFF contacts or switches with a solenoid 58. Solenoid 58 is connected to line 64 leading to ignition switch 23 and plunger 59. A first normally closed switch having contacts 60 and 61, are closed with plunger 59. Line 64 is connected to contact 60. A line 62 connects contact 61 to an indicator 63, shown as a red light. Indicator 63 is mounted on the vehicle dash in a location where it can be observed by the vehicle operator. Light 63 will be ON if relay 57 does not function, thereby informing the vehicle operator that headlights 12, 13, and taillights 14, 15 are OFF.

A pair of normally open switches of relay 57 are connected to headlights 12, 13, taillights 14, 15 and parking lights 20. A first open switch has a contact 66 connected to power line 65 coupled to battery 21 and a contact 67 connected to line 68 leading to headlight and taillight line 41. Contact 69 is also connected to line 65. Contact 70 is connected to line 71 leading to taillight line 44. Contacts 66, 67 and 69, 70 are normally open. When plunger 59 is moved by energization of solenoid 58, contacts 66, 67 and 69, 70 are closed connecting headlights 12, 13, taillights 14, 15 and parking lights 20 to battery 21, thereby turning these lights ON. These lights are ON as long as ignition switch 23 is in the RUN position.

A manually-operated switch 38, having a movable actuator 39, can be used to turn headlights 12, 13 and taillights 14, 15 ON. Switch 38 is connected to power line 37 joined to cable 22 and line 41 leading to headlights 12, 13 and taillights 14, 15. Dimmer switch 76 is coupled to line 41 to control the high and low beam conditions of headlights 12, 13.

A manually-operated parking light switch 42, having a movable actuator 43, is connected to power line 37 and line 44 leading to parking lights 20. Switch 42 can be part of switch 38 whereby actuator 39 is used to couple power line 37 to parking lights 20.

A wiper control switch 46, having a linear movable actuator 47, is electrically coupled to motor 16 with line 48. Line 48 is also connected to solenoid 49 of relay 45 with line 50A so that when wiper control switch 46 is turned to the ON position, motor 16 will operate to reciprocate wiper blades 18 and energize solenoid 49, thereby closing the electric contacts 51, 52 with movable plunger 55. Contact 52 is connected with line 54 to headlights 12, 13 and taillights 14, 15. When wiper control switch 46 is turned ON, the headlights 12, 13 and taillights 14, 15 are turned ON so that the windshield wipers operate when headlights 12, 13 and taillights 14, 15 are ON. Relay 45 is a back-up switch used to make sure that headlights 12, 13 and taillights 14, 15 are ON when the windshield wipers are operating in the event of a failure of the electric circuit to first relay 57 or a malfunction of the first relay.

A light responsive switch 73 is connected with a line 74 to power line 50 and line 50A joined to solenoid 49. Light responsive switch 43 will automatically turn to its ON position when the light intensity surrounding the light responsive switch means is below a selected level indicative of visually dark environmental conditions to electrically connect solenoid 49 to battery 21 when ignition switch 23 is ON. Solenoid 49, when energized, will close contacts 51, 52, thereby connecting power line 37 to the headlight line 54 so that the headlights 12, 13 and taillights 14, 15 are ON and the windshield wipers are operating when light responsive switch is ON. Light responsive switch 73 will automatically turn OFF when subjected to light, such as sunlight, thereby de-energizing solenoid 49 whereby power line 37 is disconnected from the headlight and taillight line 54 and windshield wiper motor line 48.

The electrical system includes a conventional headlight dimmer switch 76 incorporated into headlight line 41. Dimmer switch 76 is a manually operated lever such as a hand lever, located adjacent the steering column of the vehicle to allow the operator of the vehicle to conveniently switch the lights to dim or bright operating conditions.

In use, ignition switch 23 is normally in the OFF position. When the operator of the vehicle desires to start the engine of the vehicle, ignition switch 23 is turned to the full ON or START position, thereby connecting starter solenoid 25 and ignition 33 to battery 21. The remaining portions of the electrical system are OFF so that maximum electrical power can be used by motor 29 to operate the vehicle starter. When the vehicle is started, ignition switch 23 is moved to the RUN position which connects line 36 to battery 21, thereby energizing solenoid 58, opening the contacts 60, 61. Red light 63 will then be OFF. The energized solenoid 58 will turn contacts 66, 67 and 69, 70 to the ON positions, thereby supplying electric power to the headlights 12, 13 and taillights 14, 15. Parking lights 20 will also be turned ON, as they are connected with line 71 to parking light line 44. Headlights 12, 13 and taillights 14, 15 can be manually turned ON with the headlight switch 38. The operator of the vehicle pulls the switch actuator 39 out to the ON position thereby connecting the power line 37 to headlight line 41. The parking light switch 42 is also connected to power line 37. Parking light switch 42 has a movable actuator 43 which, when moved to the ON position, will connect power line 37 to parking light line 44 and thereby turn ON parking lights 20. Headlights 12, 13, taillights 14, 15 and parking lights 20 can be turned ON when the engine is not operating, as the power line 37 is directly connected to battery cable 22.

Figure 2:
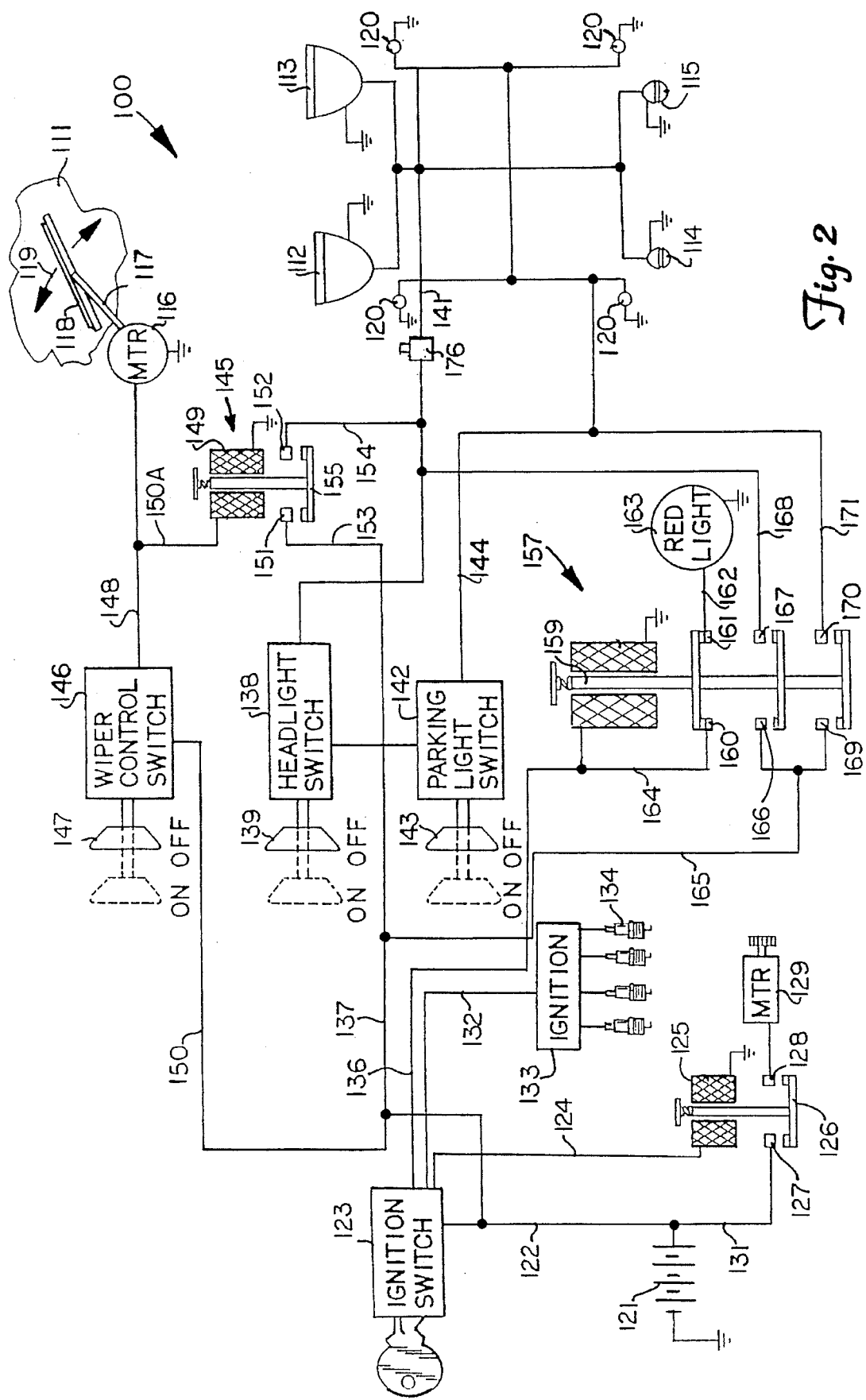
FIG. 2 is a diagrammatic view of a second motor vehicle electric system for controlling the headlights, taillights, parking lights and windshield wipers of the invention.

Referring to FIG. 2, there is shown an electric system, indicated generally at 100, for a motor vehicle such as an automobile, a pick-up truck, tractor, snowmobile and like motor vehicles equipped with headlights, taillights, parking lights and windshield wipers. The vehicle has a conventional windshield 111, a pair of front headlights 112, 113 and a pair of rear taillights 114, 115. The windshield wiper has a wiper motor 116, such as a DC electric motor, joined to a gear head connected to an arm 117. A blade 118, pivotally mounted on the outer end of arm 117, is moved over windshield 111 in the direction of arrows 119 on operation wiper motor 116. The vehicle is also equipped with the conventional parking lights 120, located at the front and rear portions of the vehicle.

The electric power for the vehicle is supplied from a conventional battery 121 joined with a cable 122 to an ignition switch 123 that is normally mounted on the dash or steering column of the vehicle in the drivers compartment. Ignition switch 123 is a key-operated switch having START, RUN and OFF positions. The switch can have a power ON position between the RUN and OFF positions. When switch 123 is turned to the START position, all electric power to electric circuits other than the ignition circuit and emergency light circuits is OFF to provide maximum electric power to starter motor 129. An electric conductor line 124 connects switch 123 to solenoid 125 of a starter relay. The starter relay has a movable plunger 126 that is adapted to engage switch contacts 127 and 128, and connect starter motor 129 to battery 121. A cable 131 connects battery 121 to contact switch 127. When solenoid 125 is energized, contacts 127 and 128 are closed thereby energizing motor 129. As soon as switch 123 moves from the START position, solenoid 125 is de-energized, causing electric contact 127 and 128 to open thereby terminating the electric power to motor 129. The ignition switch 123 is also connected with a line 132 to the ignition components 133, such as an electronic ignition system coupled to vehicle spark plugs 134. Ignition switch 123 is further connected to a line 136 leading to a first relay, indicated generally at 157, to connect battery 121 to headlights 112, 113, taillights 114, 115 and parking lights 120, thereby turning these lights ON when the engine is operating. Electric power is supplied to relay 157 when ignition switch 123 is in the RUN position.

Relay 157 has three poles, with one normally ON and two normally OFF contacts or switches with a solenoid 158. Solenoid 158 is connected to line 64 leading to ignition switch 23 and plunger 159. A first normally closed switch having contacts 160 and 161, are closed with plunger 159. Line 164 is connected to contact 160. A line 162 connects contact 161 to an indicator 163, shown as a red light. Indicator 163 is mounted on the vehicle dash in a location where it can be observed by the vehicle operator. Light 163 will be ON if relay 157 does not function, thereby informing the vehicle operator that headlights 112, 113, and taillights 114, 115 are OFF.

A pair of normally open switches of relay 157 are connected to headlights 112, 113, taillights 114, 115 and parking lights 120. A first open switch has a contact 166 connected to power line 165 coupled to battery 121 and a contact 167 connected to line 168 leading to headlight and taillight line 141. Contact 169 is also connected to line 165. Contact 170 is connected to line 171 leading to taillight line 144. Contacts 166, 167 and 169, 170 are normally open. When plunger 159 is moved by energization of solenoid 158, contacts 166, 167 and 169, 170 are closed connecting headlights 112, 113, taillights 114, 115 and parking lights 120 to battery 121, thereby turning these lights ON. These lights are ON as long as ignition switch 123 is in the RUN position.

A manually-operated switch 138, having a movable actuator 139, can be used to turn headlights 112, 113 and taillights 114, 115 ON. Switch 138 is connected to power line 137 joined to cable 122 and line 141 leading to headlights 112, 113 and taillights 114, 115. Dimmer switch 176 is coupled to line 141 to control the high and low beam conditions of headlights 112, 113.

A manually-operated parking light switch 142, having a movable actuator 143, is connected to power line 137 and line 144 leading to parking lights 120. Switch 142 can be part of switch 138 whereby actuator 139 is used to couple power line 137 to parking lights 120.

A wiper control switch 146, having a linear movable actuator 147, is electrically coupled to motor 116 with line 148. Line 148 is also connected to solenoid 149 of relay 145 with line 150A so that when wiper control switch 146 is turned to the ON position, motor 116 will operate to reciprocate wiper blades 118 and energize solenoid 149, thereby closing the electric contacts 151, 152 with movable plunger 155. Contact 152 is connected with line 154 to headlights 112, 113 and taillights 114, 115. When wiper control switch 146 is turned ON, the headlights 112, 113 and taillights 114, 115 are turned ON so that the windshield wipers operate when headlights 112, 113 and taillights 114, 115 are ON. Relay 145 is a back-up switch used to make sure that headlights 112, 113 and taillights 114, 115 are ON when the windshield wipers are operating in the event of a failure of the electric circuit to first relay 157 or a malfunction of the first relay.

The electrical system includes a conventional headlight dimmer switch 176 incorporated into headlight line 141. Dimmer switch 176 is a manually operated lever such as a hand lever, located adjacent the steering column of the vehicle to allow the operator of the vehicle to conveniently switch the lights to dim or bright operating conditions.

In use, ignition switch 123 is normally in the OFF position. When the operator of the vehicle desires to start the engine of the vehicle, ignition switch 123 is turned to the full ON or START position, thereby connecting starter solenoid 125 and ignition 133 to battery 121. The remaining portions of the electrical system are OFF so that maximum electrical power can be used by motor 129 to operate the vehicle starter. When the vehicle is started, ignition switch 123 is moved to the RUN position which connects line 136 to battery 121, thereby energizing solenoid 158, opening the contacts 160, 161. Red light 163 will then be OFF. The energized solenoid 158 will turn contacts 166, 167 and 169, 170 to the ON positions, thereby supplying electric power to the headlights 112, 113 and taillights 114, 115. Parking lights 120 will also be turned ON, as they are connected with line 171 to parking light line 144. Headlights 112, 113 and taillights 114, 115 can be manually turned ON with the headlight switch 138. The operator of the vehicle pulls the switch actuator 139 out to the ON position thereby connecting the power line 137 to headlight line 141. The parking light switch 142 is also connected to power line 137. Parking light switch 142 has a movable actuator 143 which, when moved to the ON position, will connect power line 137 to parking light line 144 and thereby turn ON parking lights 120. Headlights 112,113, taillights 114, 115 and parking lights 120 can be turned ON when the engine is not operating, as the power line 137 is directly connected to battery cable 122.

While there has been shown and described preferred embodiments of the headlights "ON" control system for motor vehicles of the invention, it is understood that changes in the structure and circuits may be made by those skilled in the art without departing from the invention. For example, switches 38, 138, 42, 142, 46 and 146 can be key-pad controls for operating the wipers, headlights, taillights and parking lights of the vehicle. The invention is defined in the following claims.

I claim:

1. A control apparatus for a vehicle having a windshield wiper means to clear the windshield operable to connect an electric power source to the vehicle headlights, taillights and electric powered means to operate the windshield wiper means of the vehicle only when the headlights are ON comprising: an ignition switch having START, RUN and OFF positions connected to the electric power source, first relay means having a solenoid electrically connected to said ignition switch to energize the solenoid when the ignition switch is in the RUN position, said first relay means having normally open switch means connected to the electric power source, headlights and taillights so that when the solenoid is energized, the switch means closes, thereby turning the headlights and taillights ON, windshield wiper switch means connected to said ignition switch operable in response to at least ON and OFF conditions to control operation of said electric powered means to operate the windshield wiper means, said windshield wiper means having a wiper actuator movable to ON and OFF positions, headlight switch means operable to selectively turn the headlights and taillights ON and OFF, said headlight switch means having a headlight actuator selectively movable to ON and OFF positions, second relay means connected to the electric power source and headlights and taillights, said second relay means having a solenoid connected to said windshield wiper switch means, said second relay means being actuated in response to operation of said wiper actuator in the ON position to complete an electrical circuit to the headlights and taillights and light responsive switch means connected to the ignition switch and said solenoid of said second relay means, said light responsive switch means operably turns the headlights ON when the light intensity surrounding the light responsive switch means is below a selected level indicative of visually dark environmental conditions and energizes said electric powered means, thereby operating the windshield wiper means.

2. The control apparatus of claim 1 wherein: the first relay means has a normally closed second switch means connected to the ignition switch, indicator means connected to the second switch means to signal non-operation of the first relay means, said indicator means being ON when the second switch means is closed, and OFF when the second switch means is open, said second switch means being open when the solenoid is energized.

3. The control apparatus of claim 2 wherein: the indicator means is a light indicator to generate visible light.

4. The control apparatus of claim 1 wherein: the vehicle has parking lights and parking light switch means connected to the electric power source and parking lights.

5. The apparatus of claim 1 wherein: the second relay means is a solenoid-operated switch that is open when the wiper actuator is in the OFF position and closed when the wiper actuator is in the ON position to complete the electric circuit to the headlights and taillights.

6. The apparatus of claim 1 wherein: the second relay means has electric contact means and a solenoid operable to close the electric contact means, said solenoid being electrically connected to the windshield wiper switch means, said electric contact means being electrically connected to the headlights, taillights and electric power source to turn the headlights and taillights ON when the wiper control switch is turned ON.

7. A control apparatus for a vehicle having headlights, taillights, a windshield, windshield wipers, an electric motor means to operate the windshield wiper means, to connect an electric power source to the vehicle headlights and taillights and to operate the windshield wipers when the light intensity surrounding the vehicle is below a selected level indicative of visually dark environmental conditions comprising: an ignition switch having START, RUN and OFF positions connected to the electric power source, relay means having a solenoid and normally open switch means, said solenoid being electrically connected to the ignition switch and electric motor means to operate the windshield wipers when the solenoid is energized, the normally open switch means closes, thereby turning the headlights and taillights ON, and light responsive switch means connected to the ignition switch and solenoid, said light responsive switch means operably turns the headlights ON when the light intensity surrounding the light responsive switch means is below a selected level indicative of visually dark environmental conditions and energizes said electric motor means, thereby operating the windshield wipers.

8. The apparatus of claim 7 including: an electric conductor line connecting the ignition switch with the solenoid, said light responsive switch being interposed within said electric conductor line.

9. The apparatus of claim 7 including: a wiper control switch connected to the ignition switch, electric motor means and solenoid whereby when the wiper control switch is ON, the electric motor means is energized to operate the windshield wipers and the solenoid is energized to turn the headlights and taillights ON.

10. A control apparatus for a vehicle having headlights, taillights, a windshield, windshield wipers and electric motor for operating the windshield wipers to connect an electric power source to the vehicle headlights and taillights and to the electric motor means to operate the windshield wipers of the vehicle only when the headlights are ON comprising: an ignition switch having START, RUN and OFF positions connected to the electric power source, first relay means having a solenoid electrically connected to the ignition switch to energize the solenoid when the ignition switch is in the RUN position, said first relay means having normally open switch means connected to the electric power source, and headlights and taillights so that when the solenoid is energized, the switch means closes thereby turning the headlights and taillights ON, a wiper switch operable to control the operation of the electric motor means to operate the windshield wipers, first conductor means connecting the wiper switch to the ignition switch, a headlight switch operable to connect and disconnect the electric power source with the headlights and taillights, second conductor means connecting the headlight switch to the headlights and taillights, and second relay means to complete the electric circuit to the headlights, taillights and electric motor means when the wiper switch is ON and, so that the electric motor means operates the windshield wipers only when the headlights and taillights are ON in event of failure of the first relay.

11. The control apparatus of claim 10 wherein: the first relay means has a normally closed second switch means connected to the ignition switch, indicator means connected to the second switch means to signal non-operation of the first relay means, said indicator means being ON when the second switch means is open, said second switch means being open when the solenoid is energized.

12. The control apparatus of claim 11 wherein: the indicator a light indicator is means to generate visible light.

13. The control apparatus of claim 10 wherein: the vehicle has parking lights, said normally open switch means of the first relay means comprises a normally open switch connected to the headlights, said first relay means including a second normally open switch connected to the parking lights, said first and second switches also being connected to the electric power source.

14. The control apparatus of claim 10 wherein: the second relay means is a solenoid-operated switch that is open when the wiper actuator switch is in the OFF position and closed when the wiper switch is in the ON position to complete the electric circuit to the headlights and taillights.

15. The control apparatus of claim 10 wherein: the second relay has electric contact means and a solenoid operable to close the electric contact means, said solenoid being electrically connected to the windshield wiper switch means, said electric contact means being electrically connected to the headlights, taillights and electric power source to turn the headlights ON when the wiper switch is turned ON.

16. A control apparatus for a vehicle having headlights, taillights, a windshield, windshield wipers and electric power means to operate the windshield wiper means of the vehicle only when the headlights are ON comprising: an ignition switch having START, RUN and OFF positions connected to the electric power source, first relay means having a solenoid electrically connected to the ignition switch to energize the solenoid when the ignition switch is in the START and RUN positions, said first relay means having normally open switch means connected to the electric power source, and headlights and taillights so that when the solenoid is energized, the switch means closes thereby turning the headlights and taillights ON, windshield wiper switch means connected to said ignition switch operable in response to at least ON and OFF conditions to control the operation of the electric motor means to operate the windshield wiper means, said windshield wiper means having a wiper actuator movable to ON and OFF positions, headlight switch means operable to selectively turn the headlights and taillights ON and OFF, said headlight switch means having a headlight actuator selectively movable to ON and OFF positions, and second relay means connected to the electric power source, headlights and windshield wiper switch means, said second relay means being actuated in response to operation of the wiper actuator in the ON position to complete an electric circuit to the headlights and taillights in the event that the first relay means does not turn the headlights and taillights ON, whereby the electric powered means operates the windshield wipers only when the headlights and taillights are ON.

17. The control apparatus of claim 16 wherein: the first relay means has a normally closed second switch means connected to the ignition switch, indicator means connected to the second switch means to signal non-operation of the first relay means, said indicator means being ON when the second switch means is closed, and OFF when the second switch means is open, said second switch means being open when the solenoid is energized.

18. The control apparatus of claim 17 wherein: the indicator means is means to generate visible light.

19. The apparatus of claim 16 wherein: the second relay means is a solenoid-operated switch that is open when the wiper actuator is in the OFF position and closed when the wiper actuator is in the ON position to complete the electric circuit to the headlights and taillights in the event that the first relay means does not turn the headlights and taillights ON.

20. The apparatus of claim 16 wherein: the second relay means has electric contact means and a solenoid operable to close the electric contact means, said solenoid being electrically connected to the windshield wiper switch means, said electric contact means being electrically connected to the headlights, taillights and electric power source to turn the headlights and taillights ON when the wiper control switch is turned ON.

* * * * *